(12) United States Patent
Okamura et al.

(10) Patent No.: US 7,019,960 B2
(45) Date of Patent: Mar. 28, 2006

(54) ELECTRIC DOUBLE-LAYER CAPACITOR

(75) Inventors: Michio Okamura, Yokohama (JP);
Hitoshi Nakamura, Yokohama (JP);
Kotaro Kobayashi, Tokyo (JP)

(73) Assignees: Power Systems Co., Ltd., Yokohama (JP); Japan Gore-Tex Inc., Tokyo (JP); Kokoku Intech Co., Ltd., Tokyo (JP)

( * ) Notice: Subject to any disclaimer, the term of this patent is extended or adjusted under 35 U.S.C. 154(b) by 0 days.

(21) Appl. No.: 10/514,473

(22) PCT Filed: May 16, 2003

(86) PCT No.: PCT/JP03/06108

§ 371 (c)(1),
(2), (4) Date: Nov. 16, 2004

(87) PCT Pub. No.: WO03/098649

PCT Pub. Date: Nov. 27, 2003

(65) Prior Publication Data

US 2005/0152091 A1    Jul. 14, 2005

(30) Foreign Application Priority Data

May 17, 2002 (JP) .............................. 2002-143194

(51) Int. Cl.
*B65D 51/16* (2006.01)
(52) U.S. Cl. ...................... 361/521; 361/534; 361/517; 361/535
(58) Field of Classification Search ................ 361/502, 361/511, 512, 517–520, 521, 534, 536–538, 361/540
See application file for complete search history.

(56) References Cited

U.S. PATENT DOCUMENTS

2005/0039806 A1* 2/2005 Nakayama et al. ......... 137/853

FOREIGN PATENT DOCUMENTS

| JP | 29441/1972 | | 12/1972 |
|---|---|---|---|
| JP | 107049/1979 | | 7/1979 |
| JP | 62-154557 | | 7/1987 |
| JP | 7784/1992 | | 1/1992 |
| JP | 9-293637 | | 11/1997 |
| JP | 11-102682 | | 4/1999 |
| JP | 11145015 | * | 5/1999 |
| JP | 11-260671 | | 9/1999 |
| JP | 2000-216068 | | 8/2000 |
| JP | 2000-260411 | | 9/2000 |
| JP | 2003-37028 | | 2/2003 |

* cited by examiner

*Primary Examiner*—Anthony Dinkins
(74) *Attorney, Agent, or Firm*—Westerman, Hattori, Daniels & Adrian, LLP

(57) ABSTRACT

The invention provides an electric double-layer capacitor sealed up by a flexible casing material that ensures a release of pressure upon an increasing internal pressure. A pressure release valve (1) is attached to the flexible casing material. The pressure release valve (1) comprises a collar airtightly joined to the flexible casing material and a cylindrical portion (3) connected to the collar, extending out of a capacitor enclosure. The cylindrical portion (3) comprises an end part (5) having a self-closing passage (6) that is opening to the outside only upon a pressure release and is closed up in a normal state, and a channel (4) in communication with the interior of the capacitor enclosure.

8 Claims, 13 Drawing Sheets

ELECTRIC DOUBLE-LAYER CAPACITOR

BACKGROUND OF THE INVENTION

Figure 1:
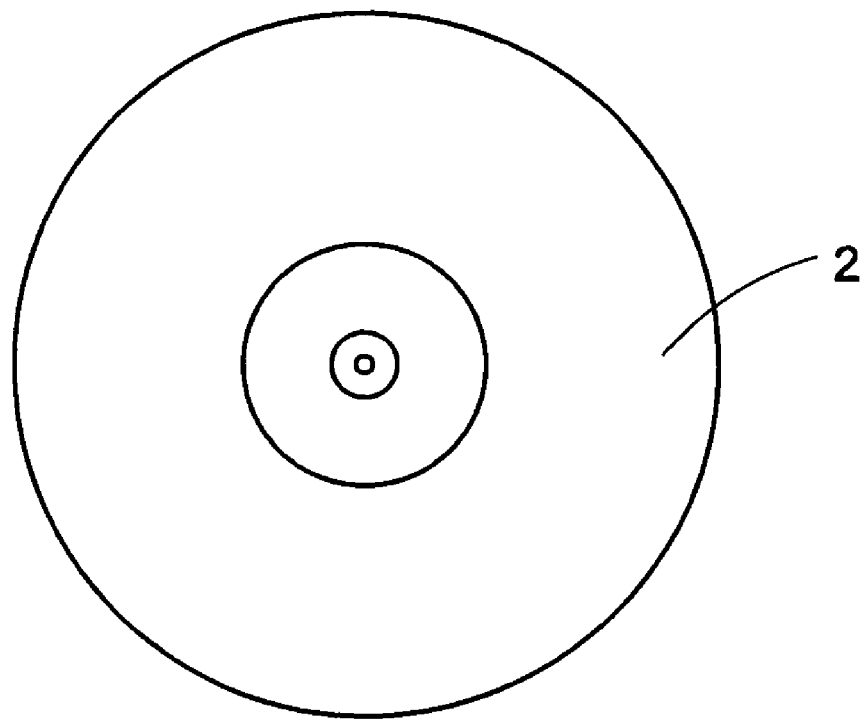
Figure 1:
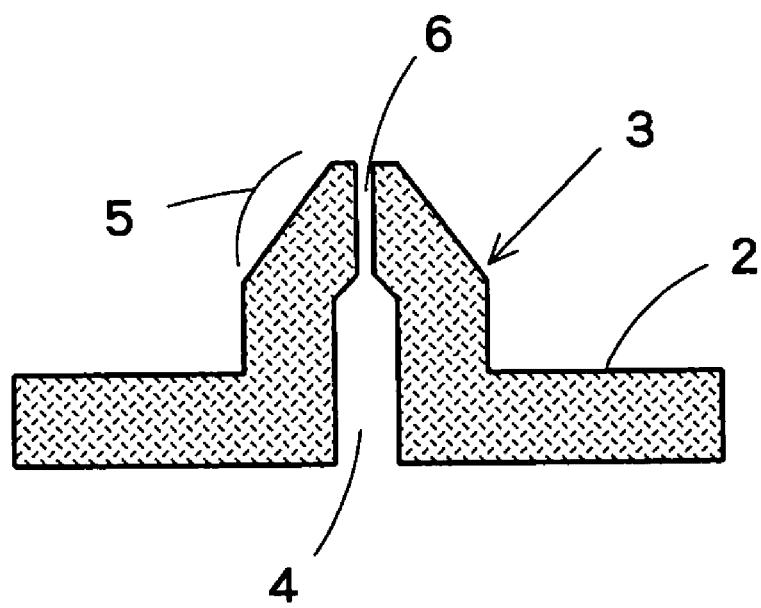

The present invention relates generally to an electric double-layer capacitor, and more particularly to an electric double-layer capacitor having a restorable pressure release valve that is sealed up by a flexible casing material.

Making use of an electric double-layer capacity formed at an interface between a polarizable electrode and an electrolyte, an electric double-layer capacitor has the feature of being much larger in capacity than that comprising electrodes with a dielectric material interposed between them, and is now under development as promising power storage means.

Electric double-layer capacitors known so far in the art are broken down into two types, one type using an aqueous solvent electrolyte and another relying upon a non-aqueous solvent electrolyte. The aqueous solvent type is low in applied voltage due to the electrolysis voltage of water and, in contrast thereto, the non-aqueous solvent type has a great feature of being operated at higher voltage than the aqueous solvent type.

Referring to the electric energy stored in the capacitor, storage efficiency of electric energy increases with an increasing applied voltage, as can be seen from the unit ½ $CV^2$ for electric energy. Thus, the electric double-layer capacitor of the non-aqueous solvent electrolyte type can be well fit for energy storage such as power storage.

Problems with the electric double-layer capacitor of the non-aqueous solvent electrolyte are that as atmospheric moisture enters the electrolyte, the electrolysis voltage of the electrolyte decreases or the non-aqueous solvent electrolyte decomposes. For the electric double-layer capacitor using a non-aqueous solvent electrolyte, therefore, a capacitor enclosure is sealed up to prevent entrance of atmospheric moisture therein.

When the electric double-layer capacitor is used as a condenser, it is of vital importance that the output or energy density of the capacitor is high; the output and energy per volume or weight are large. For this reason, an electric double-layer capacitor enclosed in a flexible casing material obtained by lamination of a synthetic resin film of small mass and an aluminum foil or the like rather than in a metallic can material would be preferable.

The electric double-layer capacitor has an extended charge-discharge cycle life and can be used over an extended period of time, because degradation and deterioration of electrodes are limited due to the absence of such chemical reactions of materials as found in secondary batteries. However, the demerit is that internal pressure rises due to the decomposition of the materials used such as electrolyte and the desorption of moisture adsorbed in the materials during long-term use.

Generally speaking, as internal pressure rises in non-aqueous electrolyte secondary batteries such as lithium ion batteries due to gas generation, abnormal electrochemical reactions proceed to the point where the batteries deteriorate irreparably. For these batteries, therefore, irreparable pressure release valves comprising thin portions that are cleaved or broken are used.

On the other hand, the electric double-layer capacitor has the feature of continuing to work even after internal pressure is released off by operation of the pressure release valve, on condition that the electrolyte is kept in a given amount. For this electric double-layer capacitor, therefore, it is very significant means to rely on a restorable pressure release valve. For such a restorable pressure release valve, a number of arrangements making use of spring resiliency or the like have been generally known in the art. For an electric double-layer capacitor using a flexible casing material such as a synthetic resin film, however, there is still no small-size restorable pressure release valve that is easily joinable to the flexible casing material.

The inventors have already filed Japanese Patent Application No. 2001-80180 to come up with an electric double-layer capacitor comprising a pressure release valve that uses a flexible casing material. Depending on the states of components of the pressure release valve, however, there are inconveniences such as deposition of emissions resulting from the supporting electrolyte materials in the electrolyte onto the outside of the pressure release valve, and a rupture of the flexible casing material.

The inventors have also filed Japanese Patent Application No. 2001-294179 to propose an electric double-layer capacitor to which a pressure release valve having a self-closing passage through it is attached.

Figure 13:
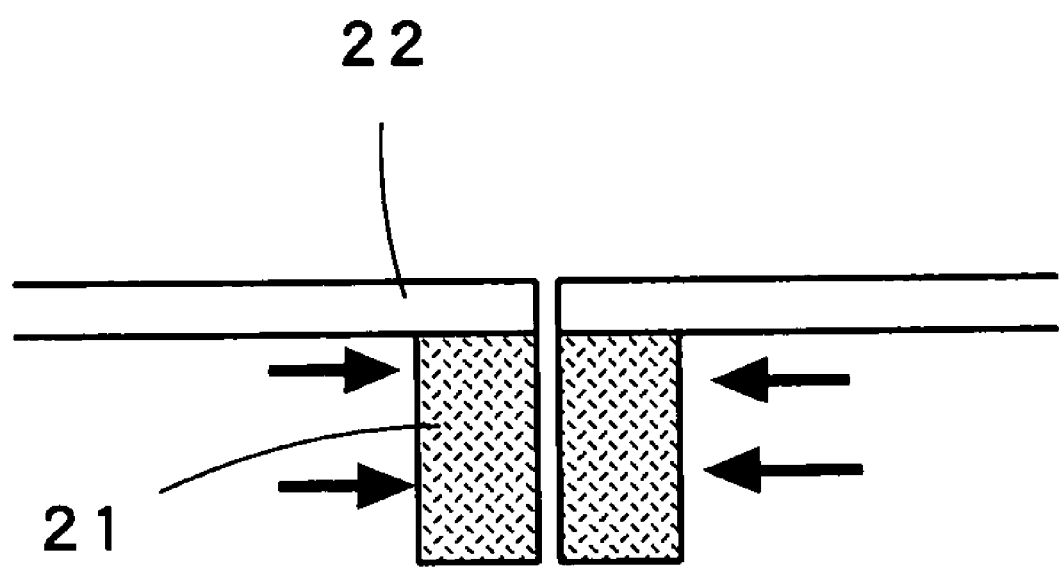

This pressure release valve is typically shown in FIG. 13. As shown, a conventional pressure release valve 21 comprises a member of rubber elasticity and a flexible casing material joined directly thereto, and has the feature of being capable of attachment with no additional device.

A problem with this pressure release valve 21 that comprises an elastomer having a self-closing passage and is attached to a flexible casing material 22 is that internal pressure is often not released at a precisely preset pressure due to deformation of the elastomer and the flexible casing material upon an increasing pressure.

Another problem is that upon actuation of the pressure release valve, the pressure release valve does not effectively work due to precipitation of supporting electrolytic materials in the electrolyte.

A primary object of the invention is to provide an electric double-layer capacitor that uses a non-aqueous solvent electrolyte and is sealed up by a flexible casing material, which comprises a pressure release valve that is actuated precisely in response to an abnormal pressure rise to release off internal pressure, so that the electric double-layer capacitor can maintain its own performance over an extended period of time.

SUMMARY OF THE INVENTION

Thus, the present invention provides an electric double-layer capacitor sealed up by a flexible casing material, wherein:

a pressure release valve is attached to said flexible casing material, said pressure release valve comprises a collar air-tightly joined to the flexible casing material and a cylindrical portion connected to the collar, extending out of a capacitor enclosure, and said cylindrical portion comprises an end part having a self-closing passage that is opening to the outside only upon a pressure release and is closed up in a normal state and a channel in communication with an interior of the capacitor enclosure.

Preferably, said collar is provided thereon with a layer of material that is easily joinable to an associated joining surface of the flexible casing material.

Preferably, said end part having a self-closing passage is of a conical or truncated cone shape that diminishes in diameter toward a pointed end.

Preferably, said end part having a self-closing passage is provided with a member that limits outward extension of said end part.

Preferably, said end portion having a self-closing passage is formed of an olefinic synthetic rubber.

Preferably, said olefinic synthetic rubber is a polymer blend comprising a polypropylene and an ethylene-propylene-diene copolymer.

Preferably, said channel is provided with a porous member having a combined liquid repellency and gas transmission.

Preferably, the porous member comprises a fluororesin.

Preferably, said pressure release valve is connected with an emission discharge conduit.

The present invention also provides a capacitor pack having a plurality of electric double-layer capacitors received in capacitor enclosures, wherein each electric double-layer capacitor is provided with said pressure release valve, and an emission discharge conduit is connected to said pressure release valve in such a way that an end of said emission discharge conduit is located externally of said capacitor enclosure.

BEST MODE OF CARRYING OUT THE INVENTION

With the electric double-layer capacitor sealed up by a flexible casing material according to the invention, it has been found that by providing a self-closing passage and a channel in communication with the interior of the capacitor enclosure through a cylindrical elastomer portion of rubber elasticity extending externally from the wall surface of the flexible casing material, it is possible to provide a pressure release valve that ensures a release of internal pressure without being affected by deformation or the like due to a pressure difference even when the internal pressure of the electric double-layer capacitor increases and, upon restoration, enables the interior of the capacitor enclosure to be kept airtight from outside.

By locating a porous member comprising fluororesin on the channel, it is also possible to provide an electric double-layer capacitor that can transmit gases upon an increasing pressure and, at the same time, can prevent leakage of a non-aqueous electrolyte and precipitation with the pressure release valve of a supporting electrolyte, etc. from the electrolyte.

In other words, it has been found that although a polar material used as the solvent for a non-aqueous electrolyte such as ethylene carbonate or propylene carbonate has liquid repellency with respect to the porous film member composed of fluororesin or the like, the aforesaid porous film member having a given porosity can transmits gasses alone while shielding off the non-aqueous electrolyte.

An arrangement wherein an elastomer of rubber elasticity having a self-closing passage is positioned within a flexible casing material is characterized in that there are no protrusions, etc. on the outer surface of an enclosure. A problem with such an arrangement, however, is that difficulty is encountered in a precise release at a given pressure of internal pressure through the self-closing passage, because the elastomer is pressurized from outside by an increasing pressure within the enclosure. According to the invention, however, it is possible to provide an electric double-layer capacitor having a pressure release valve and received in an enclosure comprising a flexible casing material, in which by providing a self-closing passage and a channel in communication therewith on the outside of the casing material, so that the pressure release valve is protected against poor operation due to deformation upon an increasing pressure.

The present invention is now explained with reference to the accompanying drawings.

FIGS. 1(A) and 1(B) are a plan view and a sectional view of one embodiment of the pressure release valve attached to a flexible casing material, which is used with the electric double-layer capacitor according to the invention.

A pressure release valve 1 comprises a collar 2 to be joined to a flexible casing material for the electric double-layer capacitor and a cylindrical portion 3 that extends out of the flexible casing material when the collar 2 is attached to an associated joining surface of the flexible casing material. The cylindrical portion 3 has therein a channel 4 in communication with the interior of a capacitor enclosure, and is provided through an end part 5 with a self-closing passage 6 that is usually airtightly closed up by rubber elasticity, and is operable to communicate with the interior of the capacitor enclosure at an increasing pressure.

As shown in FIG. 1(B), the cylindrical portion is of a truncated cone shape wherein the end part 5 diminishes in diameter toward its pointed end. While the cylindrical portion may be of the same diameter, it is understood that the above tapering configuration ensures smoother pressure release operation. In FIGS. 1A and 1B, the self-closing passage is in an open state.

Although the joining surface of the collar 2 to the flexible casing material may be either a surface on which the cylindrical portion 3 is located or its opposite surface, it is preferable that the surface of the collar with the cylindrical portion 3 located thereon is joined to an easily joining surface of the flexible casing material, and the collar 2 is located within the capacitor enclosure formed of the flexible casing material.

While the self-closing passage may be formed of a hole of circular or rectangular shape in axially vertical section, it is preferable that the cylindrical portion 3 is holed, grooved or otherwise processed by means of a pointed tool without wasting material.

The self-closing passage could be provided after attachment of the pressure release valve to the electric double-layer capacitor. If the self-closing passage is provided after assembling of the electric double-layer capacitor, leakage testing for the sealed site of the electric double-layer capacitor or the joint of the pressure release valve to the flexible casing material can then be easily performed.

Figure 2:
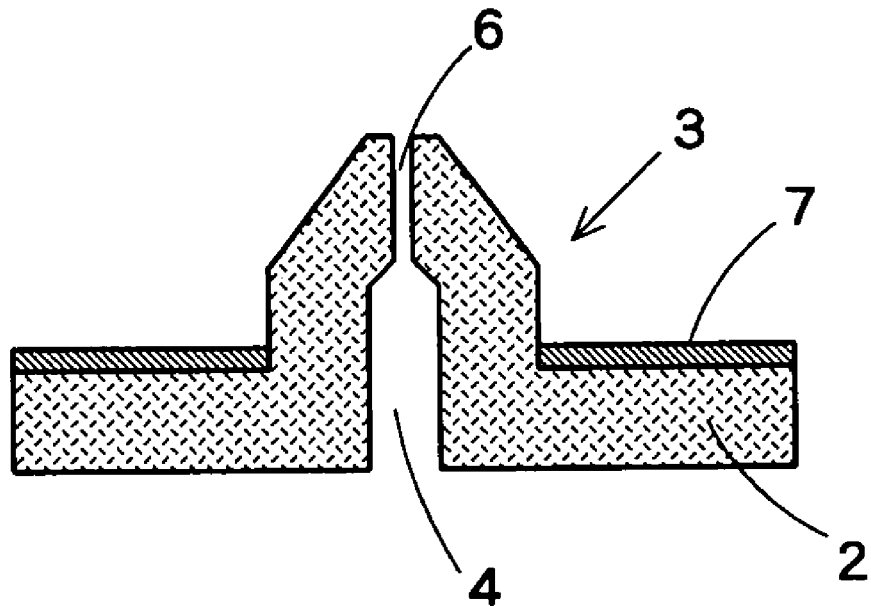
Figure 2:
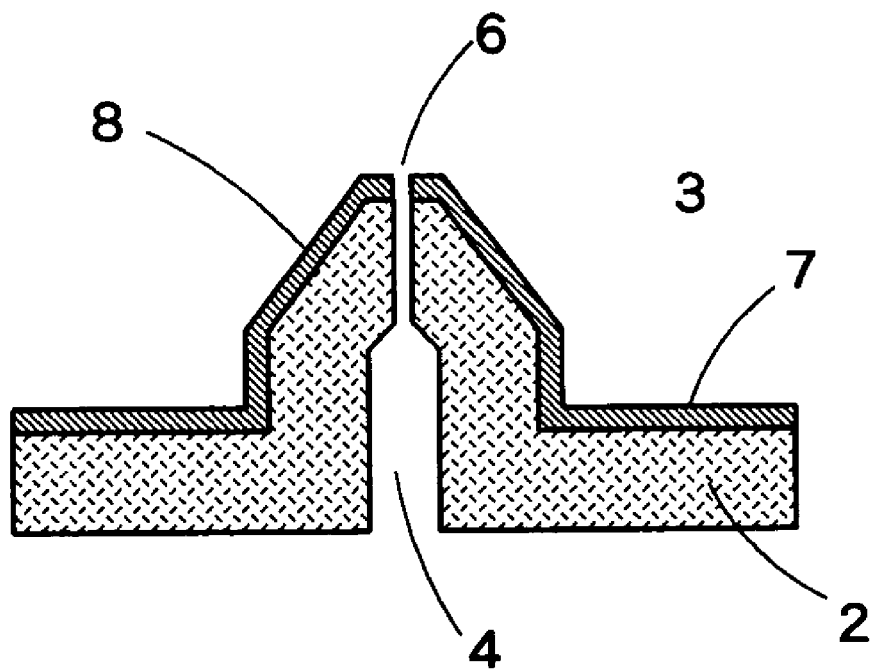

FIGS. 2(A) and 2(B) are illustrative of another embodiment of the pressure release valve in the electric double-layer capacitor of the invention.

A pressure release valve 1 depicted in FIG. 2(A) comprises a collar 2 to be joined to a flexible casing material and a cylindrical portion 3 that extends out of the flexible casing material when the collar 2 is attached to the inside surface of the flexible casing material.

The collar 2 is provided with a joining layer 7 formed of a material that is different from a rubber elastomer forming part of the pressure release valve 1 and joins easily to the joining surface of the flexible casing material. The provision of the joining layer 7 ensures that the pressure release valve can join easily to the flexible casing material, and the formation of the layer of different material on the collar ensures that the rigidity of the collar increases. It is thus possible to obtain a pressure release valve that has greater strength, and is less deformable so that it can work under more precise pressure.

Referring to FIG. 2(B), a covering layer 8 is applied to the surface of a cylindrical portion 3 and its end part, leading to the joining layer 7 formed on the collar of the pressure release valve.

The application of the covering layer 8 makes the rigidity of the rubber elastomer forming part of the pressure release valve greater. It is thus possible to obtain a pressure release valve of greater strength.

In FIGS. 2(A) and 2(B) alike, the self-closing passage remains open.

Figure 3:
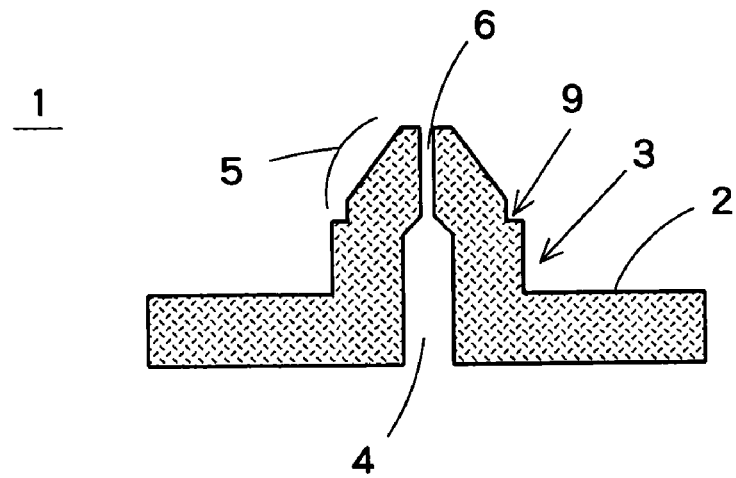
Figure 3:
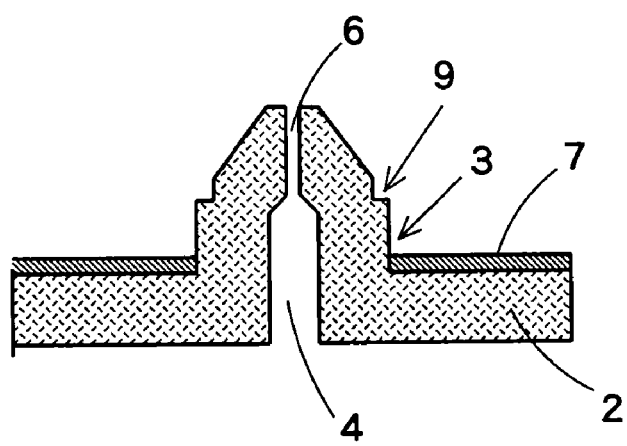
Figure 3:
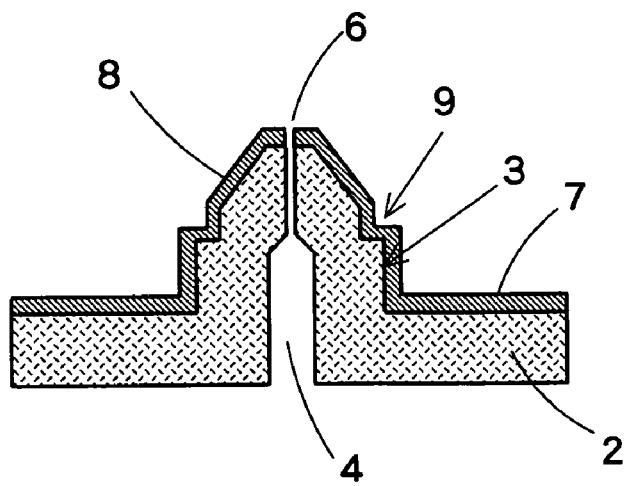

FIGS. 3(A), 3(B) and 3(C) are illustrative of yet another embodiment of the pressure release valve in the electric double-layer capacitor of the invention.

FIG. 3(A) shows a step 9 provided at the cylindrical portion 3 of the pressure release valve depicted in FIG. 1, wherein a end part 5 is located on the step 9. FIG. 3(B) shows a step 9 at the cylindrical portion 3 of the pressure release valve depicted in FIG. 2(A), and FIG. 3(C) shows a step 9 at the cylindrical portion 3 of the pressure release valve depicted in FIG. 2(B).

By the provision of the step it is possible to improve the degree of freedom in determining the size of the cylindrical portion of the pressure release valve and designing its end part.

Throughout FIGS. 3(A), 3(B) and 3(C), a self-closing passage 6 is in an open state.

Figure 4:
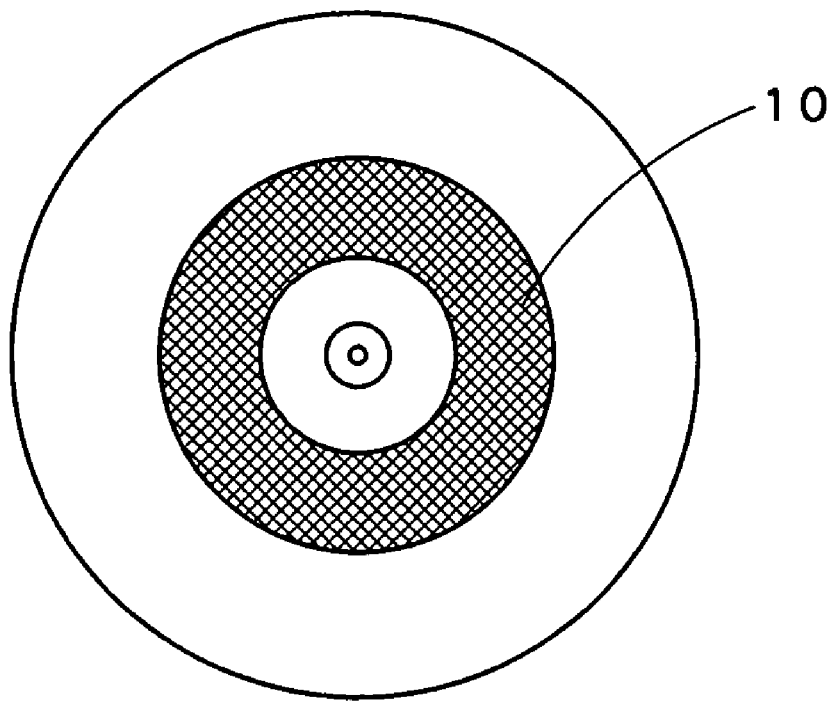
Figure 4:
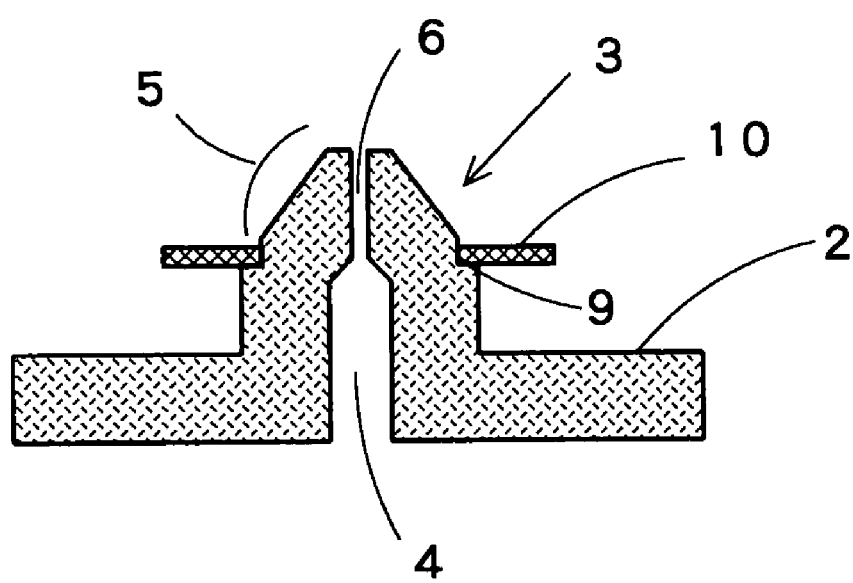

FIGS. 4(A) and 4(B) are a plan view and a sectional view of a further embodiment of the pressure release valve in the electric double-layer capacitor of the invention.

A pressure release valve 1 comprises a collar 2 to be joined to a flexible casing material and a cylindrical portion 3 that extends out of the flexible casing material when the collar 2 is attached to the inside surface of the flexible casing material.

The cylindrical portion 3 is provided with a step 9 and an end part 5 that is smaller in diameter than the cylindrical portion 3. At a site of the step 9 facing away from a self-closing passage 6, there is provided a pressure adjuster 10. The pressure adjuster 10 is operable to keep the self-closing passage 6 from becoming wide due to a pressure difference between inside and outside a capacitor enclosure, and prevent the pressure release valve from deformation due to a rise in the internal pressure, which may otherwise cause the pressure release valve to work at a pressure lower than a predetermined pressure.

This arrangement allows the pressure for releasing the internal pressure to be greater than that in the absence of the pressure adjuster. Thus, the provision of the pressure adjuster permits a pressure release valve of the same configuration to be operable at a higher pressure.

Preferably, the pressure adjuster 10 should be located at a position of the end part of the cylindrical portion that faces away from the self-closing passage. For the pressure adjuster 10, for instance, a ring member or a V-grooved member could be used provided that they can limit the valve-opening operation of the self-closing passage. Preferably, the cylindrical portion to which the pressure adjuster is to be attached should be provided with a groove or step that conforms to the pressure adjuster.

The pressure adjuster 10 could be formed of synthetic resin, metal material or the like, and the valve-opening pressure of the self-closing passage could be adjusted in dependence on the thickness or aperture diameter of the pressure adjuster.

In FIGS. 4(A) and 4(B) alike, the self-closing passage is in an open state.

Figure 5:
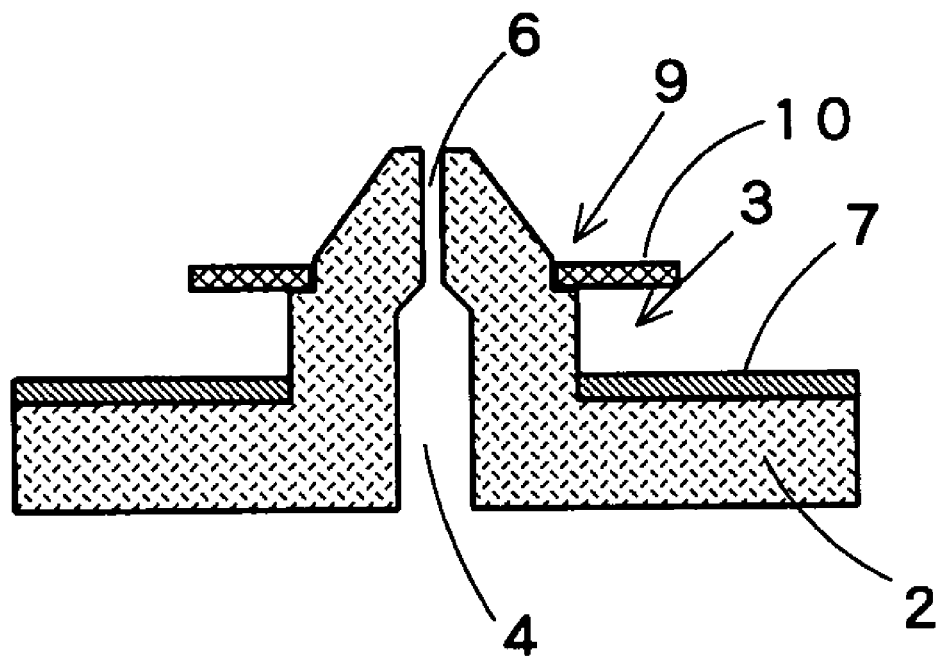
Figure 5:
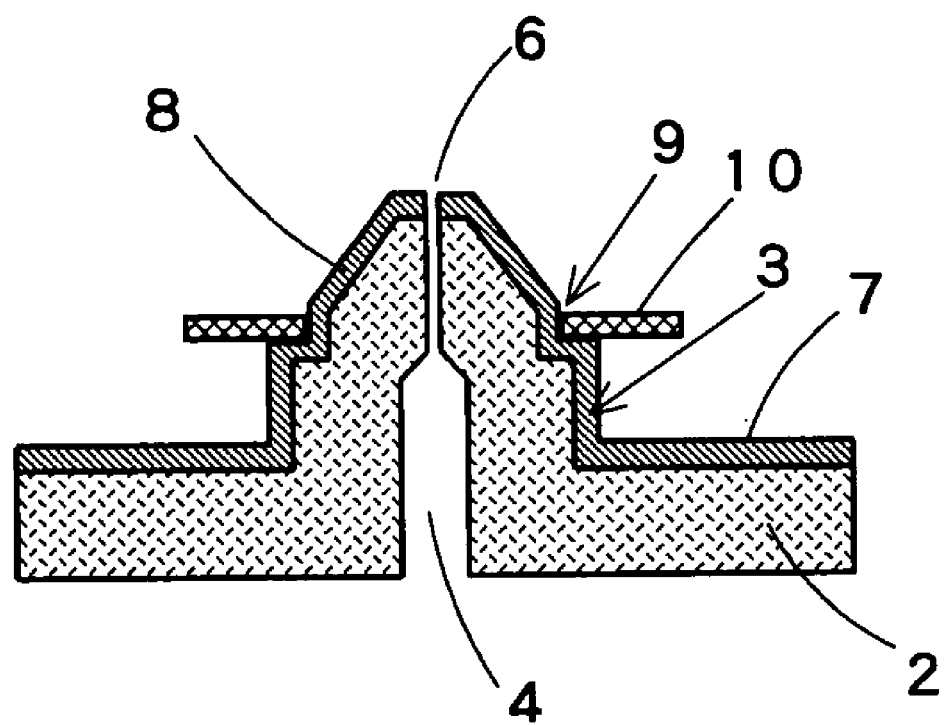

FIGS. 5(A) and 5(B) are illustrative of a further embodiment of the pressure release valve in the electric double-layer capacitor of the invention.

In a pressure release valve depicted in FIG. 5(A), a joining layer 7 is formed on the collar 2 of the pressure release valve illustrated in FIG. 3(B), and a pressure adjuster 10 is fitted to a step 9 at a cylindrical portion 3. In a pressure release valve depicted in FIG. 5(B), a covering layer 8 is applied to the surface of the cylindrical portion 3 and end part 5 of the pressure release valve illustrated in FIG. 3(C), and a pressure adjuster 10 is fitted to the step 9 at the cylindrical portion 3. With such an arrangement, it is possible to achieve a pressure release valve that has greater rigidity and higher valve-opening pressure.

In both FIGS. 5(A) and 5(B), the self-closing passage is in an open state.

The pressure release valve of the invention could be configured into any desired shape in a site-dependent manner; for instance, it could be configured into a cylindrical or rectangular shape.

The rubber elastomer material used for the electric double-layer capacitor of the invention should ensure that a self-closing passage can be created by rubber elasticity, and includes, for instance, olefinic synthetic rubbers such as ethylene propylene copolymers (EPT) and ethylene-propylene-diene copolymers (EPDM), silicone rubbers, and fluororubbers, all stable with respect to a non-aqueous electrolyte.

Preferably, the joining layer to be formed at the collar should be made up of a material that can join easily to the flexible casing material; for instance, polyethylene, and polypropylene having good fusion bondability with respect to a polyethylene or polypropylene layer used for lamination to an aluminum foil are usable as the joining layer that can join easily to the flexible casing material.

That joining layer could have been modified on its surface to improve its joining capability to the joining surface of the flexible casing material.

If the pressure release valve is molded using a material of rubber elasticity with a polyethylene or polypropylene thin film for the joining layer placed in a mold, it is then possible to obtain the joining layer by means of integral molding.

For the rubber elastomer material, just only the olefinic rubber such as EPDM but also a thermoplastic elastomer comprising polypropylene and ethylene-polypropylene-diene copolymer (EPDM) could be used. The thermoplastic elastomer comprising EPDM blended with polypropylene improves joining capability upon fusion bonding onto the surface of a thermoplastic film such as a polyethylene or polypropylene film, and so makes it possible to obtain an electric double-layer capacitor that can show stable performance over an extended period of time.

The amount of polypropylene in such a thermoplastic elastomer should be in the range of preferably 5 to 40 parts by weight, more preferably 15 to 25 parts by weight per 100 parts by weight of EPDM. Less than 5 parts by weight of polypropylene are less effective on improvements in the joining capability of EPDM, and more than 40 parts by weight have an adverse influence on rubber elasticity or the like, causing sealing capability or the like to become worse.

If the joining surface of the rubber elastomer is treated as by polishing to form minute asperities thereon, stronger joining force is then obtained.

Figure 6:
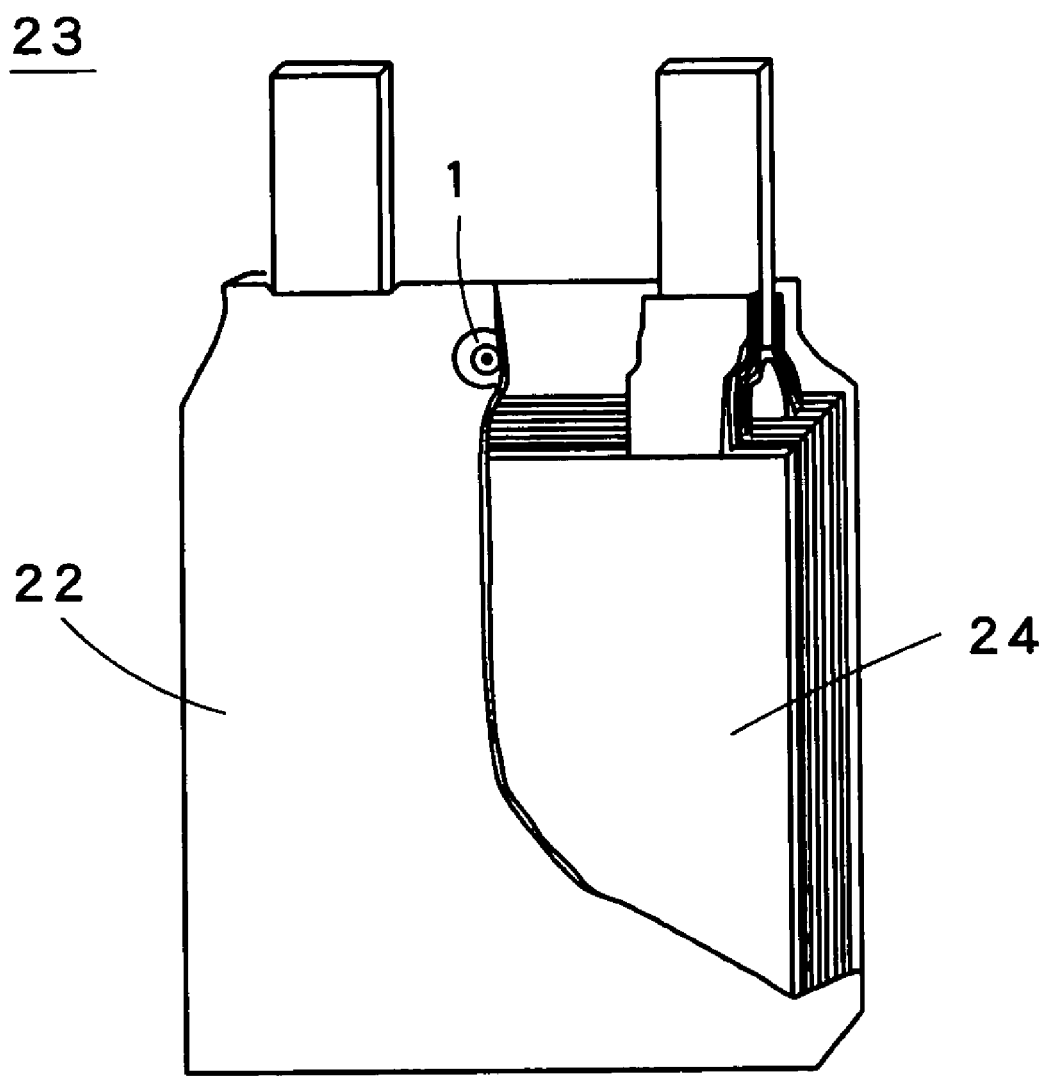

FIG. 6 is a partly taken-away perspective view of one embodiment of the electric double-layer capacitor of the invention.

An electric double-layer capacitor 23 uses a non-aqueous solvent electrolyte. A capacitor element 24 is sealed up by a flexible casing material 22, and a collar of a pressure release valve 1 made up of a rubber elastomer material is fusion bonded to the inside surface of the flexible casing material 22 in such a way as to extend out of the flexible casing material 22.

The pressure release valve 1 is mounted on top of the electrical double-layer capacitor in such a way as to be flush therewith, so that two or more electric double-layer capacitors can be placed one upon another without offering any problem.

Because the material having rubber elasticity is used for the pressure release valve 1, the self-closing passage is shut off when the pressure difference between inside and outside the electric double-layer capacitor becomes smaller than a predetermined one.

An electric double-layer capacitor can be reused after a release of pressure from within by means of a restorable pressure release valve. In a normal state, entrance of moisture or the like is preventable by relatively small tight force rather than large tight pressure, and so the electric double-layer capacitor can work well. Thus, the pressure release valve of the invention is best fit for such an electric double-layer capacitor.

In the invention, a pressure release valve previously provided with a given self-closing passage could be used; however, it is acceptable to use a separately prepared pressure release valve with no self-closing passage. In this case, an electric double-layer capacitor is prepared by attaching that pressure release valve to a flexible casing material, and then housing an electric double-layer capacitor element within a capacitor enclosure to seal up the capacitor assembly with the flexible casing material. Then, leakage testing is carried out for the sealed site of the electrical double-layer capacitor, the joint of the pressure release valve to the electric double-layer capacitor, etc. Finally, the self-closing passage is formed by providing an opening through the pressure release valve by means of a tool having a pointed edge.

Figure 7:
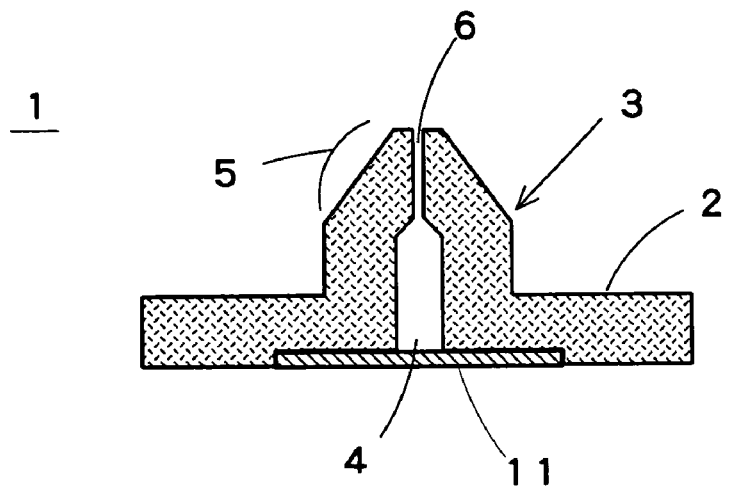
Figure 7:
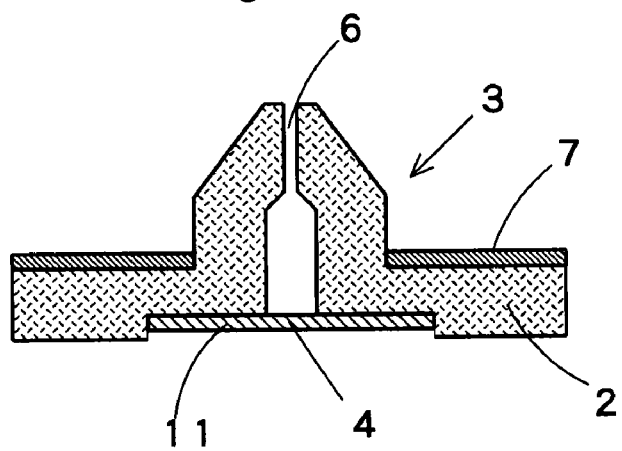
Figure 7:
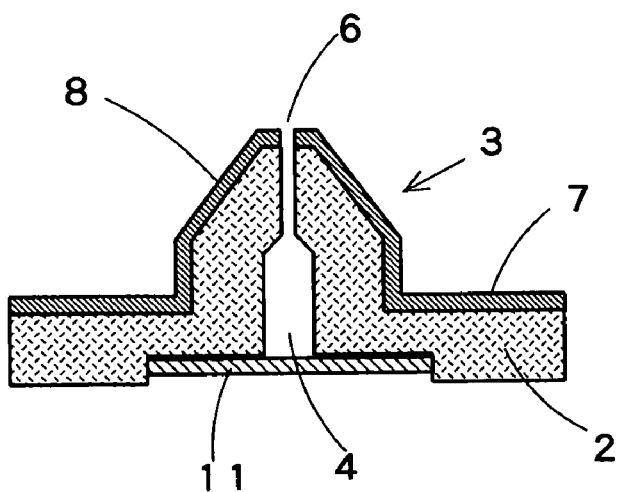

FIGS. 7(A), 7(B) and 7(C) are illustrative of a further embodiment of the pressure release valve in the electric double-layer capacitor of the invention, wherein a porous member having liquid repellency and gas transmission is located in place.

Each of pressure release valves 1 depicted in FIGS. 7(A), 7(B) and 7(C) comprises a pressure release valve 1 depicted in FIG. 1, FIG. 2(A), and FIG. 2(B) and a porous member 11 attached thereto.

The pressure release valve 1 comprises a collar to be joined to a flexible casing material of an electric double-layer capacitor and a cylindrical portion 3 that extends out of the flexible casing material when the collar 2 is attached to the joining surface of the flexible casing material. The cylindrical portion 3 has a channel 4 that is in communication with the interior of a capacitor enclosure. An end part 5 of the cylindrical portion 3 has a self-closing passage 6 that opens when the internal pressure of the capacitor enclosure increases, and remains shut off by rubber elasticity in a normal state to keep air tightness. Referring to FIG. 7(B), a joining layer is formed at the collar 2 to increase rigidity and adhesion to the flexible casing material, and referring to FIG. 7(C), a covering layer 8 is applied on the surface of the end part 5, leading to the joining layer 7.

The porous member 11 having a combined liquid repellency and gas transmission is provided in such a way as to cover the channel 4.

Having open cells to ensure air permeation, the porous member 11 is formed of a fluororesin that is made porous by stretching, foaming, extraction or the like. The fluororesin, for instance, includes polytetrafluoro-ethylene, tetrafluoro-ethylene-hexafluoropropylene copolymers, polyvinyl fluoride, and polyvinylidene fluoride. Preference is given to a porous film obtained by cleaving polytetrafluoroethylene by stretching to form minute pores therein.

The air permeability and liquid repellency of the porous film depends on the material of the fluororesin used as well as the porosity, thickness, pore diameter, etc. of the porous film, and as porosity increases, liquid repellency would tend to become low. On the other hand, lower porosity would detract from air permeability. Smaller pore diameter would cause liquid repellency to increase but air permeability to decrease. Because thickness is a factor of causing strength drops and producing pinholes, thickness of appropriate magnitude is preferably made from a thickness range that is not detrimental to air permeability.

Porosity, pore diameter and so on are determined in dependence on the properties of the liquid contained in a flexible enclosure with which the pressure release valve of the invention is used; however, it is desired to use a porosity of 1 to 90%, preferably 3 to 50%, a pore diameter of 0.02 to 3.0 µm, preferably 0.02 to 0.2 µm, and a thickness of 20 to 1,000 µm, preferably 100 to 1,000 µm. Alternatively, the fluororesin having improved liquid repellency could be integrated with an unwoven or woven fabric of chemical-resistant polypropylene or other resin.

Although the porous film of the fluororesin suitable as a member of liquid repellency and air permeability is hardly joined to an application member by means of fusion bonding, it is understood that if that porous film is heated in close contact with the pressure release valve to be joined, both can then be closely joined together because the material of rubber elasticity forming the pressure release valve melts to penetrate in minute cells throughout the porous film. When the material of rubber elasticity is molded into a pressure release valve, the porous film could be placed in a mold for integral molding therewith.

The pressure release valve with a liquid repellant member attached to it ensures that an electrolyte is prevented from reaching the self-closing passage, and in a normal state, the self-closing passage can be reliably sealed up and the electric double-layer capacitor can be depressurized at a given pressure.

FIGS. 8(A) to 8(E) are illustrative of a further embodiment of the pressure release valve in the electric double-layer capacitor of the invention, wherein a porous member of liquid repellency and gas transmission is positioned in place.

A pressure release valve 1 depicted in FIGS. 8(A), 8(B), 8(C), 8(D), and 8(E) comprises the pressure release valve 1 depicted in FIGS. 3(A), 3(B), 3(C), 5(A), and 5(B) with a porous member 11 attached to it.

Figure 8:
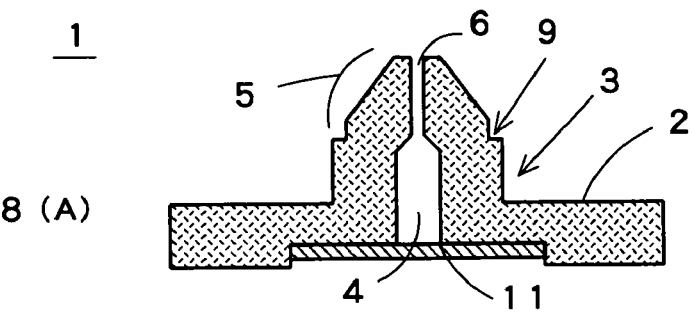
Figure 8:
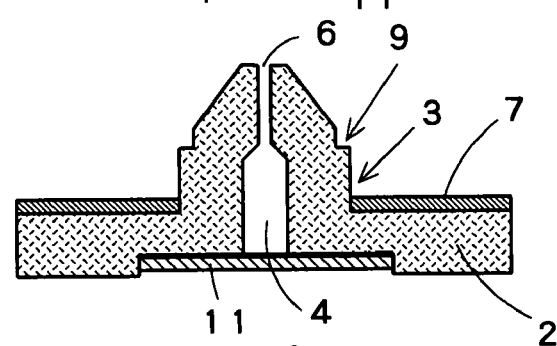
Figure 8:
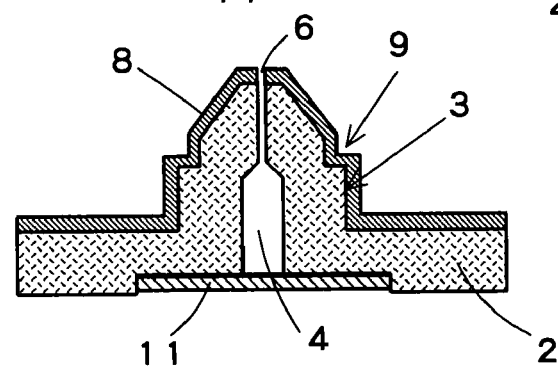
Figure 8:
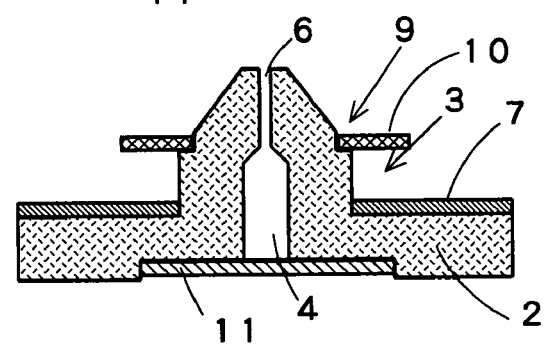
Figure 8:
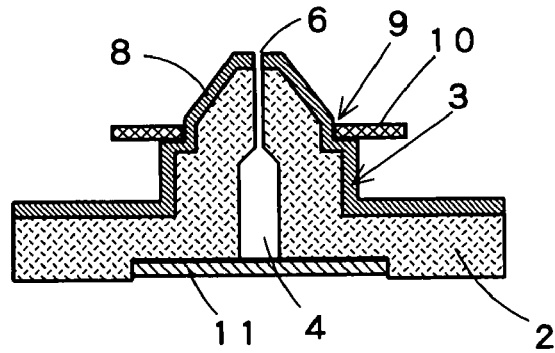

In FIG. 8(A), a cylindrical portion 3 of the pressure release valve is provided with a step 9 having an end part 5, and in FIG. 8(B), a collar 2 of the pressure release valve is provided thereon with a joining layer so as to improve rigidity and adhesion to a flexible casing material. In FIG. 8(C), a covering material 8 is applied onto the surface of an end part 5, leading to a joining layer 7, for the purpose of enhancing rigidity. In FIG. 8(D), the step 9 of the pressure release valve depicted in FIG. 8(B) is provided with a pressure adjuster 10, and in FIG. 8(E), a pressure adjuster 10 is placed at the step 9 depicted in FIG. 8(C). With each of those arrangements, it is possible to provide a pressure release valve of high rigidity and an elevated valve-opening pressure.

A porous material 11 having a combined liquid repellency and gas transmission is positioned in such a way as to cover a channel 4 through the collar.

The arrangements of FIGS. 8(A)–8(E) have the same advantages as do those of FIGS. 7(A)–7(C), ensuring that the electrical double-layer capacitor can be sealed up, and the pressure can be released out of it upon an abnormal pressure rise.

Figure 9:
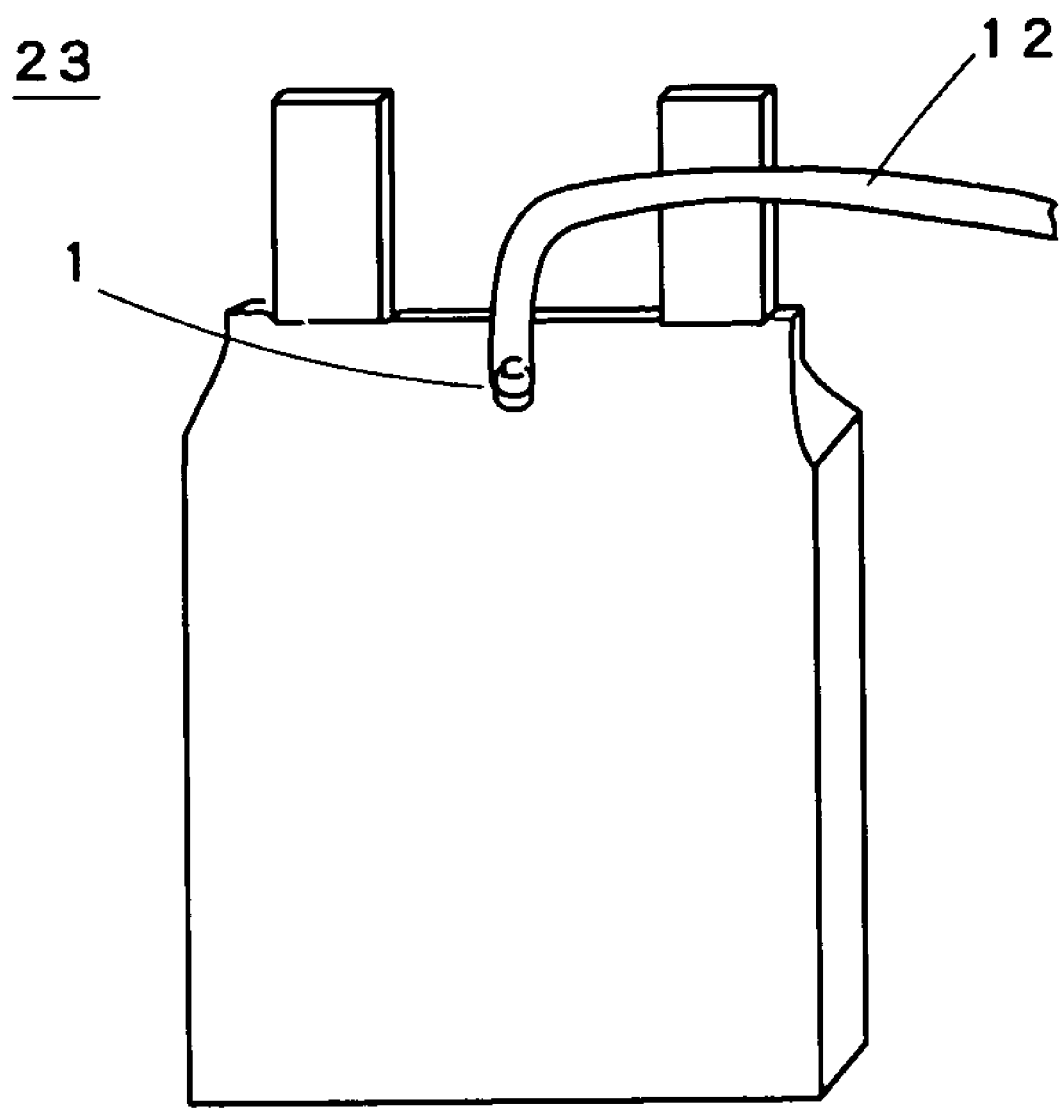

FIG. 9 is illustrative of another embodiment of the electric double-layer capacitor of the invention, wherein the pressure release valve is provided with an emission discharge conduit.

When the pressure release valve is actuated in response to an increase in the internal pressure of the inventive electric double-layer capacitor employing a non-aqueous electrolyte, mists of the non-aqueous electrolyte are often discharged along with internal moisture, etc., resulting in deposition to the flexible casing material that surrounds the pressure release valve, or the conductive terminal. However, if an emission discharge conduit 12 is attached to the pressure release valve 1, emissions can then be discharged out of any position spaced away from an electric double-layer capacitor 23, averting adverse influences thereon. For the emission discharge conduit, a tube formed of polyethylene or other synthetic resin is attached onto the cylindrical portion of the pressure release valve 1 or onto the pressure adjuster.

Figure 10:
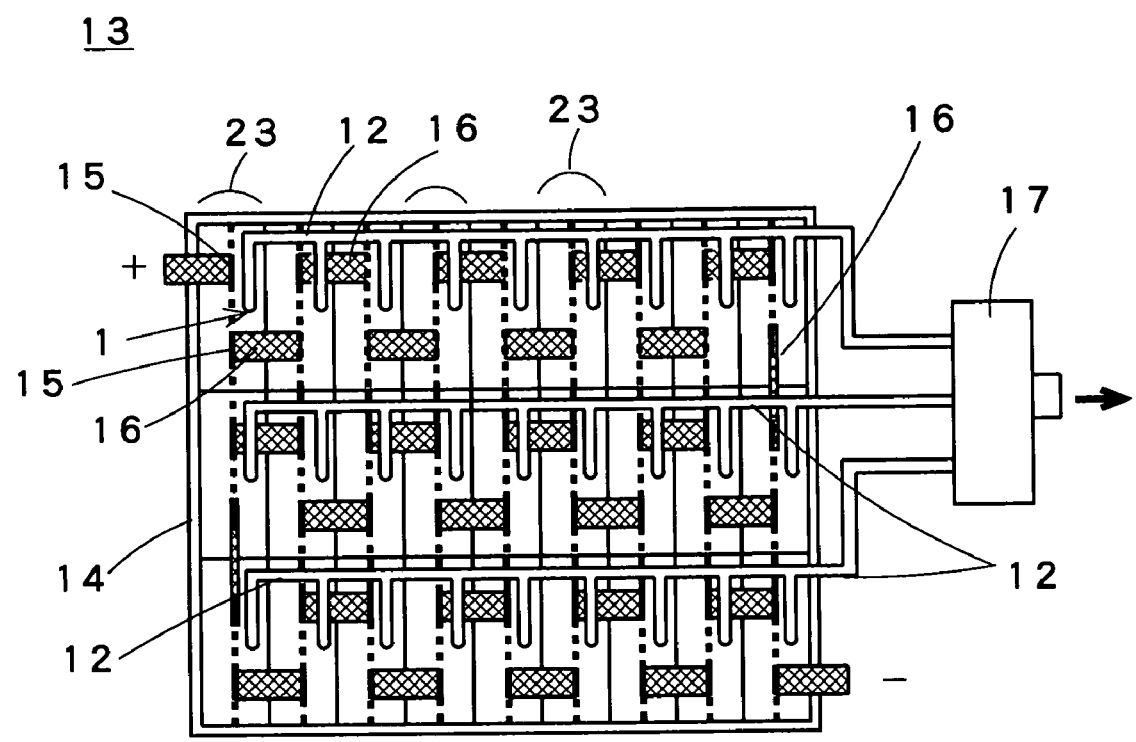

FIG. 10 is a plan view of one embodiment of a capacitor pack that receives a plurality of electric double-layer capacitors, wherein a lid member is put off.

One single electric double-layer capacitor of the invention is barely 2 to 3 V higher in rated voltage than that using an aqueous electrolyte, and does not well service as an accumulator. Therefore, a number of electric double-layer capacitors are connected in series and parallel for use in the form of a capacitor pack 13.

In the capacitor pack 13 shown, a number of electric double-layer capacitors 23 are received in a housing 14, with conductive connector terminals 15 connected in series via inter-terminal conductors 16.

A pressure release valve 1 in each electric double-layer capacitor 23 is connected with a conduit 12 for discharge of emissions occurring during its operation. The emission discharge conduit 12 is joined to removal means 17 positioned externally of the housing 14, where components contained in the non-aqueous electrolyte are removed by adsorption or other means for spewing to the atmosphere. The removal means 17 could be filled with an adsorbent such as active charcoal. The thus assembled capacitor pack can run stably over an extended period of time, because mists of the non-aqueous electrolyte are not fed back to the housing, and there is no poor insulation due to deposition of mists.

The present invention is now explained with reference to examples.

EXAMPLE 1

Figure 11:
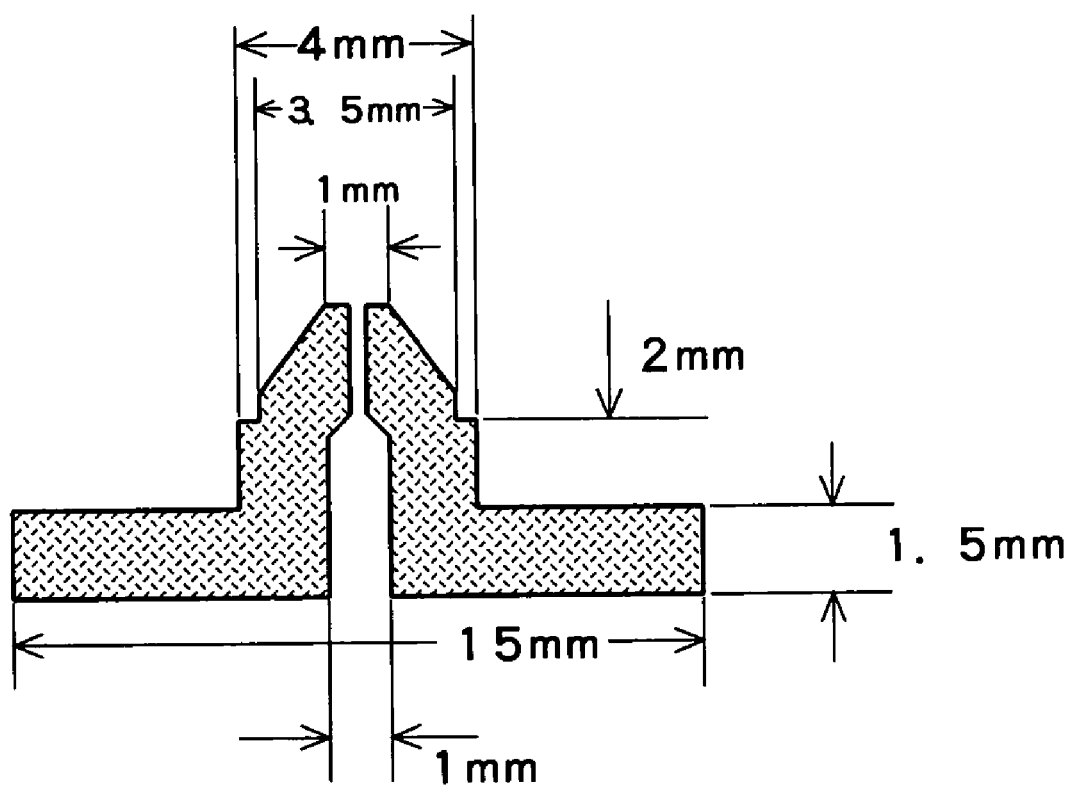

A truncated cone form of ethylene-propylene-diene copolymer pressure release valve was provided, which comprised a collar of 1.5 mm in thickness and 15 mm in diameter, a step having an outside diameter of 4 mm, an inside diameter of 1 mm and a height of 2 mm from the collar and an end portion having an outside diameter of 3.5 mm at the step and an end part of 1 mm in diameter, as shown in section in FIG. 11. The pressure release valve was then fusion bonded to a flexible casing material for an electric double-layer capacitor, which had a three-layer structure of propylene film/aluminum foil/polyester film, whereupon three sides of the flexible casing material were sealed up with a pressure testing tube attached thereto, thereby making an airtight enclosure.

After airtight testing was carried out for the sealed skite of the airtight enclosure and the portion of the pressure release valve fusion bonded thereto, a pointed needle of 0.5 mm in diameter was stuck through the end part of the pressure release valve to form a self-closing passage.

Compressed air was injected into the thus obtained 10 enclosures until actuation of the pressure release valves. By measurement, the pressure release valves were was found to be actuated at a pressure of 0.022 MPa (gauge pressure).

EXAMPLE 2

Compressed air was injected in 10 enclosures prepared as in Example 1 with the exception that a pressure release valve having a self-closing passage of 4 mm in length was used. The pressure release valves were found to be actuated at a pressure of 0.032 MPa (gauge pressure).

EXAMPLE 3

Compressed air was injected in 10 enclosures prepared as in Example 1 with the exception that a pressure release valve having a collar integral with a 40-μm thick polypropylene film was used. The pressure release valves were found to be actuated at a pressure of 0.042 MPa (gauge pressure).

EXAMPLE 4

Compressed air was injected in 10 enclosures prepared as in Example 1 with the exception of attachment of a pressure adjuster of 3.0 mm in inside diameter and 1.0 mm in thickness to an outer site of the cylindrical portion facing away from the self-closing passage. The pressure release valves were found to be actuated at a pressure of 0.072 MPa (gauge pressure).

EXAMPLE 5

Thirty (30) electric double-layer capacitors were provided, each having a pressure release valve of Example 1 attached to a flexible casing material. Each capacitor was subjected to accelerated testing of repeating a charge-discharge cycle every 10 hours on a current of 2.7 V and 10 A. Throughout the capacitors, the pressure release valves were normally operated with an increasing internal pressure until 1,000 hours. In four capacitors, however, the casing materials broken due to inactivation of the pressure release valves by deposition of solid emissions precipitated from the electrolytes.

EXAMPLE 6

Figure 12:
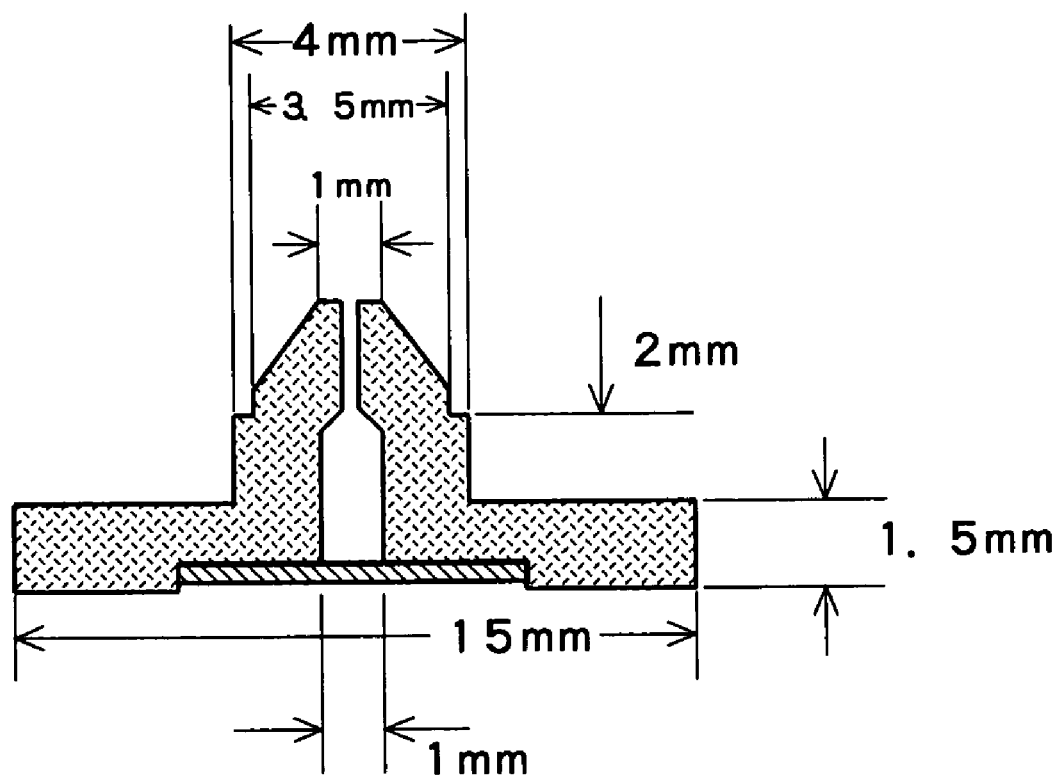

A truncated cone form of ethylene-propylene-diene copolymer pressure release valve was provided, which comprised a collar of 1.5 mm in thickness and 15 mm in diameter, a step having an outside diameter of 4 mm, an inside diameter of 1 mm and a height of 2 mm from the collar and an end portion having an outside diameter of 3.5 mm at the step and an end part of 1 mm in diameter, as shown in section in FIG. 12. A porous polytetrafluoroethylene film having a thickness of 300 μm and a porosity of 80% was provided in such a way as to cover a channel through the collar. The thus obtained pressure release valve was fusion bonded to a flexible casing material having a three-layer structure of propylene film/aluminum foil/polyester film. After this, 30 electric double-layer capacitors were prepared and subjected to charge-discharge cycle testing as in Example 5. Even after the lapse of 1,000 hours, the pressure release valves were kept airtight, with no breaking of the casing materials.

EXAMPLE 7

For the sake of comparison in terms of joining strength to a flexible three-layer casing material of a three-layer structure of propylene film/aluminum foil/polyester film, there were provided a pressure release valve made up of an ethylene-propylene-diene copolymer that did not contain any polypropylene, and a pressure release valve made up of 100 parts by weight of an ethylene-propylene-diene copolymer blended with 20 parts by weight of a polypropylene homopolymer having a melt flow rate of 10 g/10 min. (ASTM D1238 at 230° C.) and a density of 0.91 g/cm$^3$.

An ethylene-propylene-diene copolymer/polypropylene blend was cut into samples having a width of 10 mm, a length of 60 mm and a thickness of 2 mm. A 30-mm long area of each sample from its end was fusion bonded at 200° C. to a 15-mm wide, 60-mm long flexible casing material from its end.

An area of the sample that was not fusion bonded was then subjected to tensile testing at a peel rate of 10 mm/min. by means of a tensile testing machine (Strograph M100 made by Toyo Seiki Seisakusho) to measure peel strength. The results are reported in Table 1.

It is noted that a sample consisting only of the ethylene-propylene-diene copolymer was peeled at the joining surface; in the case of the ethylene-propylene-diene copolymer blended with polypropylene, however, destruction occurred at the rubber site, and it is consequently found that strength at the joining surface was stronger than actually measured.

TABLE 1

| Test No. | Peel Strength (kN/m) | |
| --- | --- | --- |
|  | EPDM alone | Blend of PP-EPDM |
| 1 | 0.88 | 2.7 |
| 2 | 0.98 | 2.5 |
| 3 | 0.69 | 2.9 |
| 4 | 0.88 | 2.9 |
| 5 | 0.78 | 2.5 |
| Average | 0.84 | 2.7 |

Comparative Example 1

Thirty (30) electric double-layer capacitors were prepared, in which a pressure release valve was prepared as in Example 1 with the exception of no provision of any liquid repellant porous film, and subjected to charge-discharge cycle testing as in Example 5. Before the lapse of 1,000 hours, the pressure release valves in four electric double-layer capacitors did not longer operate due to solid emissions precipitated from the electrolytes, with a rupture of the flexible casing materials.

INDUSTRIAL APPLICABILITIES

The present invention successfully provides an electric double-layer capacitor sealed up by a flexible casing material, which ensures precise operation of a pressure release valve, and enables pressure to be safely and reliably released out thereof upon an increased internal pressure. Thus, the electric double-layer capacitor of the invention has great safety and improved long-term reliability.

We claim:

1. An electric double-layer capacitor sealed up by a flexible casing material, characterized in that:
    a pressure release valve is attached to said flexible casing material,
    said pressure release valve comprises a collar air-tightly joined to the flexible casing material and a cylindrical portion connected to the collar, extending out of a capacitor enclosure, and
    said cylindrical portion comprises an end part having a self-closing passage that is opening to the outside upon a pressure release alone and is closed up in a normal state, and a channel in communication with an interior of the capacitor enclosure.

2. The electric double-layer capacitor according to claim 1, characterized in that said collar is provided thereon with a layer of material that is easily joinable to an associated joining surface of the flexible casing material.

3. The electric double-layer capacitor according to claim 1 or 2, characterized in that said end part having a self-closing passage is of a conical or truncated cone shape that diminishes in diameter toward a pointed end.

4. The electric double-layer capacitor according to claim 1 or 2, characterized in that said end part having a self-closing passage is provided with a member that limits outward extension of said end part.

5. The electric double-layer capacitor according to claim 1 or 2, characterized in that said end portion having a self-closing passage is formed of an olefinic synthetic rubber.

6. The electric double-layer capacitor according to claim 5, characterized in that said olefinic synthetic rubber is a polymer blend comprising a polypropylene and an ethylene-propylene-diene copolymer.

7. The electric double-layer capacitor according to claim 1 or 2, characterized in that said channel is provided with a porous member having a combined liquid repellency and gas transmission.

8. The electric double-layer capacitor according to claim 1 or 2, characterized in that the porous member comprises a fluororesin.

* * * * *